United States Patent [19]

Tohda et al.

[11] Patent Number: 4,733,128
[45] Date of Patent: Mar. 22, 1988

[54] ELECTROLUMINESCENCE DISPLAY DEVICE CONTAINING A ZINC SULFIDE EMISSION LAYER WITH RARE EARTH ELEMENTS AND/OR HALIDES THEREOF AND PHOSPHORUS

[75] Inventors: Takao Tohda, Ikoma; Yosuke Fujita, Ashiya; Masahiro Nishikawa, Amagasaki; Tomizo Matsuoka, Neyagawa; Atsushi Abe, Ikoma; Tsuneharu Nitta, Katano, all of Japan

[73] Assignee: Matsushita Electric Industrial Co. Ltd., Osaka, Japan

[21] Appl. No.: 673,557

[22] PCT Filed: Feb. 9, 1984

[86] PCT No.: PCT/JP84/00036

§ 371 Date: Oct. 5, 1984

§ 102(e) Date: Oct. 5, 1984

[87] PCT Pub. No.: WO84/03099

PCT Pub. Date: Aug. 16, 1984

[30] Foreign Application Priority Data

Feb. 10, 1983 [JP] Japan .................. 58-20606

[51] Int. Cl.$^4$ .................. H05B 33/14; H05B 33/18
[52] U.S. Cl. .................. 313/503; 252/301.6 P
[58] Field of Search .............. 313/503, 463, 467, 468, 313/498; 252/301.4 P, 301.4 H, 301.6 P

[56] References Cited

U.S. PATENT DOCUMENTS

| | | | |
|---|---|---|---|
| 4,171,501 | 10/1979 | Tanimizu et al. | 313/643 X |
| 4,381,474 | 4/1983 | Cusano | 313/463 X |
| 4,551,397 | 11/1985 | Yaguchi et al. | 313/467 X |

FOREIGN PATENT DOCUMENTS 329217 2/1954 Japan .
53-141185 5/1977 Japan .

Primary Examiner—David K. Moore
Assistant Examiner—K. Wieder
Attorney, Agent, or Firm—Spencer & Frank

[57] ABSTRACT

An electroluminescense display device having a emission layer comprising zinc sulfide characterized in that at least one member selected from the group consisting of rare earth elements, manganese, copper, silver, magnesium, aluminum and their halides is contained as an activator, as well as at least one member selected from the group consisting of nitrogen, phosphorus, arsenic and antimony is contained as a coactivator. Said emission layer is formed by sputtering by using, as a target, zinc sulfide containing said activator and coactivator. Said sputtering is conducted in an atmosphere comprising a rare gas or rare gas containing a sulfide gas. The electroluminescence display device of the present invention has a higher brightness than conventional device with a good repeatability.

6 Claims, 2 Drawing Figures

ELECTROLUMINESCENCE DISPLAY DEVICE CONTAINING A ZINC SULFIDE EMISSION LAYER WITH RARE EARTH ELEMENTS AND/OR HALIDES THEREOF AND PHOSPHORUS

TECHNICAL FIELD

This invention relates to an electroluminescence (EL) display device and a process for producing the same, particularly to an EL display device using a novel EL material which permits improvement of brightness and a process for producing the same.

BACKGROUND ART

It has heretofore been known from old times that zinc sulfide containing a rare earth element, a fluoride of rare earth elements, manganese or the like as an activator emits light having a color determined by the activator when a high electric field is applied thereto. For example, there have been formed thin film EL elements having a structure in which an insulator layer, an emission layer (e.g., a zinc sulfide layer containing an activator), an insulator layer and a rear electrode are successively laminated, for example, on a glass substrate equipped with a transparent electrode, and there have been obtained EL elements which are various in colors of light emitted by them depending on the kind of activator. When manganese-activated zinc sulfide is used as the emission layer, the brightness is about 5,000 cd/m$^2$ at an applied electric field of 5 KHz and is almost on the practical use level, but is insufficient in reproducibility. For example, when a manganese-activated zinc sulfide emission layer is formed by a sputtering method suitable for forming a thin film having a large area and a good film thickness distribution, the reproducibility of brightness is particularly poor. By use of a fluoride of rare earth element, there has been attained a brightness which is higher than when a rare earth element alone is used, but this brightness does not attain the practical use level. As the causes of these facts, there are considered the imperfectness of crystallinity of zinc sulfide, imperfect introduction of activator to a substitutional site of zinc sulfide crystal lattice, etc. An EL element having a high brightness is desired to be developed by removing these causes.

SUMMARY OF THE INVENTION

This invention provides an EL display device which has a high brightness and can be produced with good reproducibility and a process for producing the same, by using, as an EL emission layer, zinc sulfide containing an activator and phosphorus as a coactivator.

The EL emission layer can be formed by using as the activator at least one member selected from the group consisting of rare earth elements such as Pr, Sm, Eu, Tb, Dy, Ho, Er, Tm, and halides thereof.

As a method for adding the above-mentioned coactivator to zinc sulfide, although the above-mentioned activator and the above-mentioned coactivator may individually be added, it is also advisable to add them in the form of a compound thereof.

As to a process for producing the EL emission layer in this invention, the EL emission layer is formed by a sputtering method by using, as a target, zinc sulfide containing an activator and phosphorus as a coactivator. Thereby, an EL emission layer having a high brightness can be formed with very good reproducibility.

The percentages of the number of atoms of the activator and the coactivator to the number of atoms of zinc are preferably 0.1% or more and 10% or less.

BEST MODE FOR CARRYING OUT THE INVENTION

Figure 1:
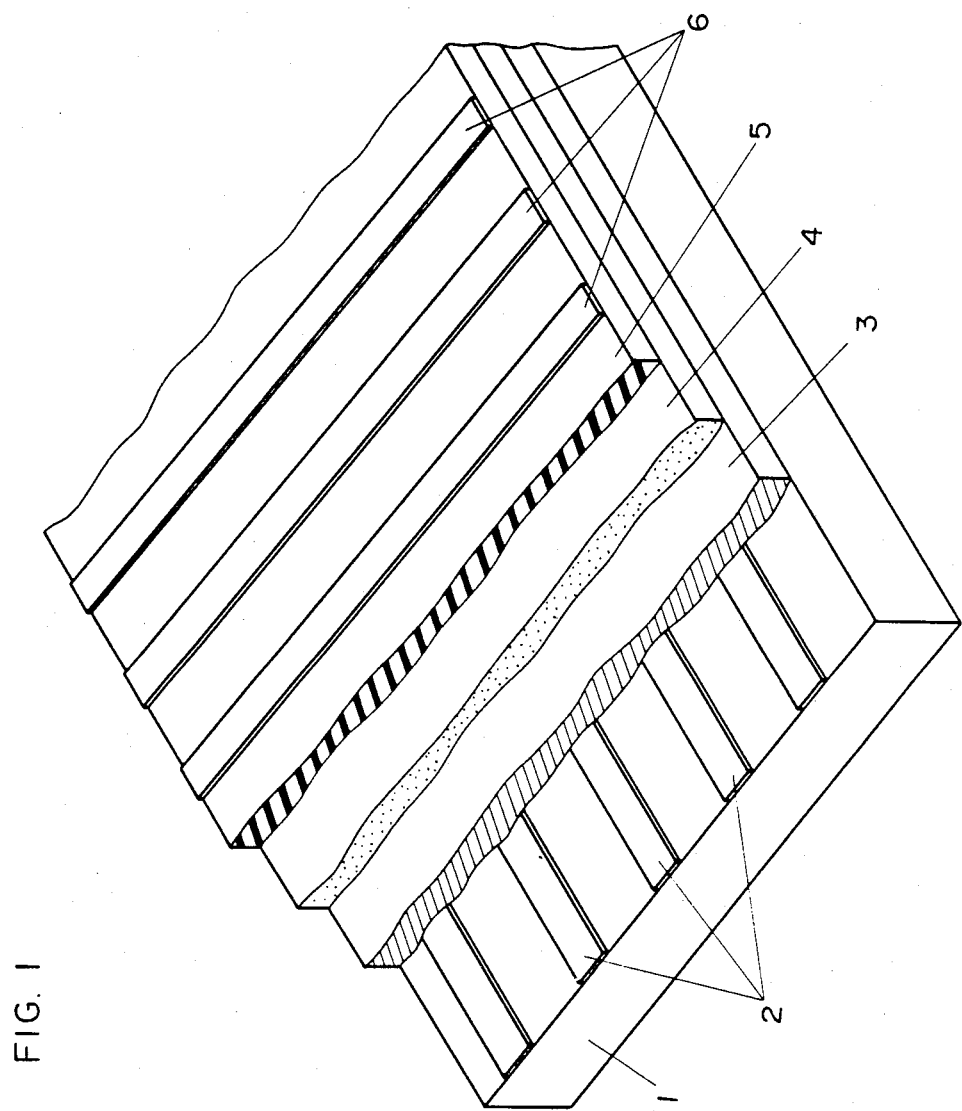
FIG. 1 is a partially sectioned perspective view showing one example of the electroluminescence display device according to this invention.

FIG. 1 shows one embodiment of the EL display device according to this invention. In this device, on one side of a transparent insulating substrate, for example, a glass substrate 1 is provided a plurality of transparent electrode layers 2 aligned in stripes in parallel with one another. The transparent electrode layers 2 are made of tin-containing indium oxide (ITO) and have a thickness of 200 nm. On the one side of the glass substrate 1 are successively formed an insulator layer 3, an EL emission layer 4 and an insulator layer 5, inclusive of the transparent electrode layer 2. Further, on the insulator layer 5 are formed a plurality of electrodes 6 aligned in stripes in parallel with one another in a direction perpendicular to the direction in which the transparent electrode layers 2 are formed. The transparent electrode layers 2 were formed by a sputtering method. The insulator layer 3 was formed to a thickness of 50 nm by electron beam evaporation of $Y_2O_3$. The EL emission layer 4 was formed to a thickness of 500 nm by radio-frequency sputtering for 10 minutes in an argon gas atmosphere at $2 \times 10^{-2}$ Torr at a substrate temperature of 250° C. by using zinc sulfide containing 1 mole% TbP as a target. Here, Tb serves as an activator and P serves as a coactivator. Thereafter, heat treatment was carried out in vacuum at 500° C. for 1 hour. The insulator layer 5 was formed to a thickness of 300 nm by electron beam evaporation of $Y_2O_3$. The electrodes 6 aligned in stripes were formed by electron beam evaporation of Al to a thickness of 300 nm, followed by working of forming the stripes by photo-lithography.

In this device, when alternating voltage or alternating pulse voltage is applied selectively between the electrodes 2 and 6, the portion of the EL emission layer 4 between the electrodes selected emits light. This light is emitted outside mainly through the glass substrate 1. Information to be displayed can be displayed in the form of images by successively applying signal voltage between the electrodes 2 and 6 in accordance with the above-mentioned information in a conventional manner.

Figure 2:
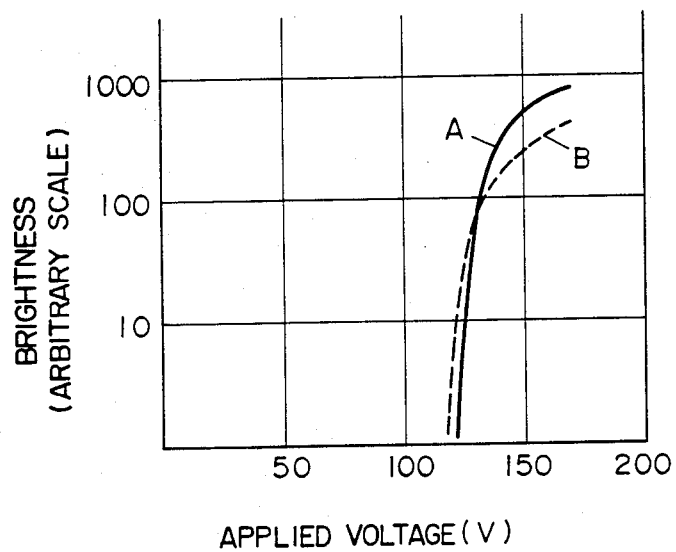
FIG. 2 is a set of curves showing the voltage-brightness characteristics of the device of the present example and a conventional device in comparison with each other.

FIG. 2 shows, in comparison with each other, the voltage-brightness characteristics of the device of the example of this invention and a conventional EL device using an EL emission layer formed under the same conditions as in the example by using a ZnS target containing 2 mol% $TbF_3$. Driving was conducted by means of an alternating pulse voltage having a pulse width of 50 μs and a frequency of 100 Hz The solid line A shows the characteristic of the example of the device of this invention, and the broken line B shows the characteristic of the conventional device.

As can be seen from the figure, the device of this invention has a higher brightness than the conventional device. The reason for this increase of brightness is presumed to be that owing to the introduction of phosphorus into zinc sulfide, Tb could be introduced to the substitutional site without seriously disturbing the crystallinity of zinc sulfide.

This invention could be conducted also by using, as the activator, at least one member selected from the group consisting of rare earth elements such as Pr, Sm, Eu, Dy, Ho, Er, Tm elements such as Mn, Cu, Ag, Mg and Al and halides and halides.

It was found that the percentages of the number of atoms of the activator and the coactivator to the number of atoms of zinc were preferably 0.1% or more and 10% or less when a rare earth element, or a halide thereof was used as the activator.

Although in the present example, the coactivator was added by using a compound of the coactivator and the activator, this invention could be conducted also by using a compound of zinc and the coactivator, for example, $Zn_3P_2$ or the like. Needless to say, these compounds may be added in combination of two or more.

Although in the example, there was explained the device having a structure in which insulating layers were formed on both sides of an EL emission layer, the effects of this invention could be obtained even when an insulating layer was formed only on one side or when no insulating layer was formed.

As to a process for producing the EL emission layers, there was explained the case where a sputtering method was used, but the same effects could be obtained even when another production process such as a vacuum evaporation method or an ion beam sputtering method is used. The essence of this invention consists in employment of phosphorus as a coactivator and rare earth elements and their halides as an activator, and it is evident that the characteristics of the EL emission layer and the like are not greatly dependent on its production process. However, an EL emission layer which was homogeneous and had a good film thickness distribution could be obtained with good reproducibility by employing a sputtering method among various production processes. As an atmosphere for sputtering, argon gas was used in the present example, but good results could be obtained also when another rare gas or a mixed gas of a rare gas and a sulfide gas was used. It was found that good reproducibility could be attained particularly when there was used a mixed gas of hydrogen sulfide gas or carbon disulfide gas and argon gas (in which the concentration of any of these sulfide gases was about 1%).

When phosphorus was used as the coactivator, there could be obtained an EL display device having a brightness which was higher than when nitrogen, arsenic or antimony was used.

INDUSTRIAL APPLICABILITY

As explained above, this invention makes it possible to realize EL display devices which have a high brightness and are various in colors of light emitted by them, by using, as an EL emission layer, zinc sulfide containing at least one member selected from the group consisting of rare earth elements and their halides as an activator and phosphorus as a coactivator. This EL display device is of great practical value as a display device which replaces display devices using a cathode-ray tube.

What is claimed is:

1. An electroluminescent display device having an emission layer comprising zinc sulfide containing
    at least one member selected from the group consisting of rare earth elements and their halides as an activator; and
    phosphorus as a coactivator.

2. The electroluminescent display device according to claim 1, wherein
    said activator and said coactivator are contained in amounts of between about 0.1% and 10% of the number of atoms thereof to the number of atoms of zinc.

3. The electroluminescent display device according to claim 1, wherein the activator is at least one member selected from the group consisting of
    terbium,
    praseodynium,
    samarium,
    europium,
    dysprosium,
    holmium,
    erbium,
    thulium, and
    halides thereof.

4. The electroluminescent display device according to claim 1, further comprising an insulator layer formed on at least one surface of said emission layer.

5. The electroluminescent display device according to claim 1, wherein the thickness of said emission layer is less than about 1 $\mu$m.

6. The electroluminescent display device according to claim 5, wherein the thickness of said insulator layer is less than about 1 $\mu$m.

* * * * *